Figure 8:
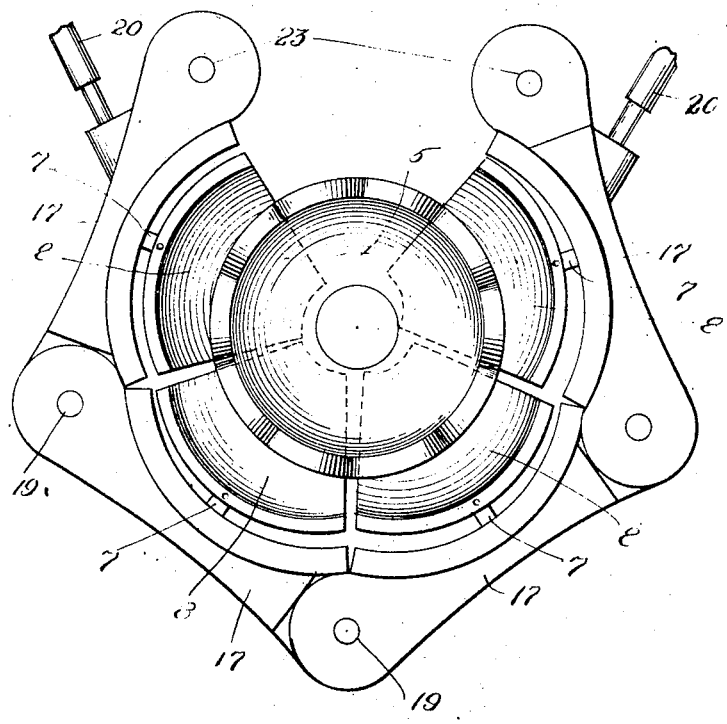

No. 886,146. PATENTED APR. 28, 1908.
W. MILLSTEIN.
GLASS MOLD.
APPLICATION FILED AUG. 23, 1907.
2 SHEETS—SHEET 1.
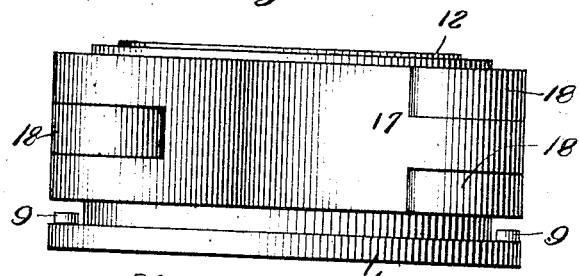
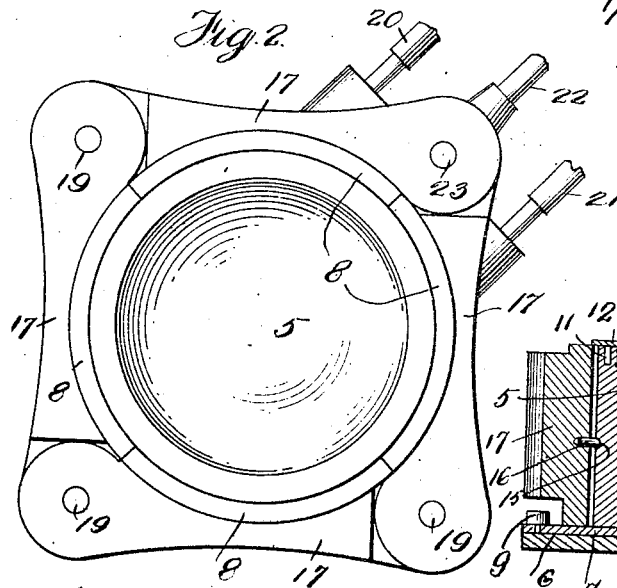
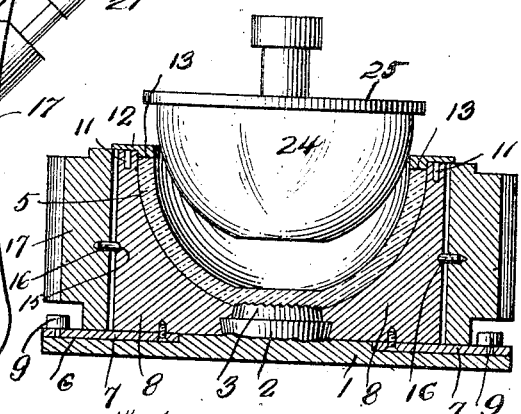
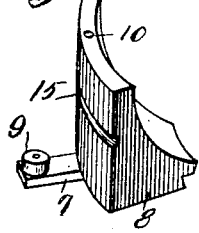
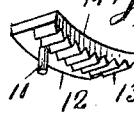
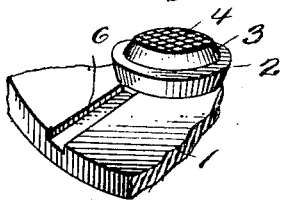
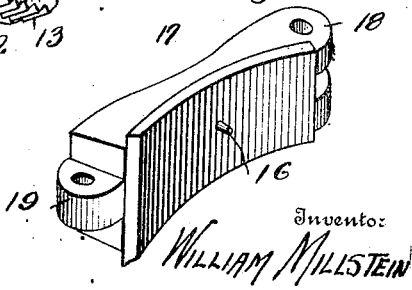
Witnesses
Samuel Payne
X. H. Butler
Inventor
WILLIAM MILLSTEIN
By H. C. Everts Co.
Attorneys.

No. 886,146.

PATENTED APR. 28, 1908.

W. MILLSTEIN.
GLASS MOLD.
APPLICATION FILED AUG. 23, 1907.

2 SHEETS—SHEET 2.

Witnesses
Samuel Payne
O. H. Butler

Inventor
William Millstein

H. C. Everett
Attorneys

UNITED STATES PATENT OFFICE.

WILLIAM MILLSTEIN, OF BEAVER, PENNSYLVANIA.

GLASS-MOLD.

No. 886,146.

Specification of Letters Patent.

Patented April 28, 1908.

Application filed August 23, 1907. Serial No. 389,849.

*To all whom it may concern:*

Be it known that I, WILLIAM MILLSTEIN, a citizen of the United States of America, residing at Beaver, in the county of Beaver and State of Pennsylvania, have invented certain new and useful Improvements in Glass-Molds, of which the following is a specification, reference being had therein to the accompanying drawing.

This invention relates to molds for forming glass and plastic metal, and more particularly for deep figured or ornamental ware and press blanks.

The primary object of this invention is to provide a mold consisting of readily separable sections, drawing direct from the center, which will shape the ware and ornament its base and upper edge.

Further objects of this invention are to save a breakage of ware; a reduction in the amount of iron used in a mold; dispensing with keying and pinning of molds, requires less cutting of a molded article, and numerous other advantages which will hereinafter appear.

A still further object is, to provide the mold sections with grooves and guide-pins to insure a ready opening and closing of the mold.

The construction of the improvement will be fully described hereinafter, in connection with the accompanying drawing which forms a part of this specification, and its novel features will be defined in the appended claims.

In the drawing: Figure 1 is a side elevation of a mold embodying the invention, Fig. 2 is a top plan view of the same, Fig. 3 is a central vertical section of the mold, with the plunger in position thereon, Fig. 4 is a perspective view of one section of the body of the mold, Fig. 5 is a detail perspective view of a part of the base of the mold, Fig. 6 is a detail perspective of a section of the ring for manufacturing the edge of the ware, Fig. 7 is a perspective view of one of the clamping arms which secure the sections of the mold body together, and Fig. 8 is a plan of a mold in open position.

The reference numeral 1 designates the base of the mold provided with a central upwardly projecting circular disk 2 having its periphery beveled downwardly, and surmounted by a boss 3, the periphery of which is beveled upwardly. The upper surface 4 of the boss 3 is serrated to impart ornamental serrations to the bottom of the ware 5 as illustrated in Fig. 3.

The base 1 is formed on its upper surface with a plurality of radial grooves 6 to receive guide arms 7, each of which is pivotally secured at its inner end to one of the sections 8 of the body of the mold, and carries at its outer end a roller 9.

Each of the mold sections 8 is provided at its upper edge with a socket 10, said socket receiving pins 11 depending from a ring 12, said ring being serrated for a portion of its width on its under surface as at 13 to serrate the edge of the ware. This ring 12 is also of undulating contour as shown at 14 to scallop the edge of the disk, as well as to impart ornamental serrations thereto. The sections 8 constituting the body of the mold are each formed with a horizontal groove 15 to receive pins 16 projecting from the inner concave faces of the clamping arms 17, said arms being pivotally secured together by overlapping perforated lugs 18, and pivot pins 19 in the manner well known in the art. Handles 20 and 21 are connected to two of the clamping arms, and a third handle 22 is secured to a shaft 23, carrying a locking eccentric which locks the mold sections together.

The utility and operation of the invention will be readily understood. After the molten glass is poured into the mold the plunger 24 is forced down to form the ware. The downward pressure of the plunger compresses the bottom of the disk against the boss 4, thus indenting the under surface of the ware as illustrated in Fig. 3. The plunger is provided with an annular flange 25 which bears upon the ring 12 to impart the required ornamental conformation to the edge of the ware. The clamping arms 17 have a free sliding movement upon the mold sections 8 by means of the grooves 15 and pins 16 permitting the molded dish to be easily and quickly removed from the mold the rollers 9 and pivoted arms 7 coöperating in the opening of the mold.

I desire to call attention to the fact that when the mold is open, the pivoted parts will prevent a figure from sticking to the mold, and as the pivoted parts of a mold release the piece of ware, the figured or ornamental part of the ware is prevented from being injured.

Having now described my invention what I claim as new, is:—

1. In a glass mold, the combination with a base, formed with radial grooves on its upper surface, of mold sections each having a guide arm pivotally secured thereto, and fitting the grooves in said base, and also formed with a horizontal groove, and a plurality of clamping arms embracing said mold sections and provided with means engaging in said horizontal grooves whereby said arms have free sliding movement upon said sections.

2. In a glass mold, the combination with a base provided with a central serrated boss, and a plurality of radial grooves, of mold sections, each having a guide arm pivotally secured thereto and fitting said grooves, rollers carried by said guide arms, clamping arms pivotally secured together and embracing said mold sections, and means for ornamenting the upper edge of the molded article.

3. In a glass mold, the combination with a base provided with a central serrated boss, and a plurality of radial grooves, of mold sections, each having a guide arm pivotally secured thereto and fitting said grooves, rollers carried by said guide arms, clamping arms pivotally secured together and embracing said mold sections, and means for ornamenting the edge of the molded article, comprising a ring formed with bands or undulations, and serrated on its under surface.

4. In a glass mold, the combination with a base provided with a central serrated boss, and a plurality of radial grooves, of mold sections each having a guide arm pivotally secured thereto and fitting said grooves, rollers carried by said guide arms, clamping arms pivotally secured together and embracing said mold sections, and means for ornamenting the edge of the molded article, comprising a ring formed with bands or undulations, and serrated on its under surface, and a plunger provided with an annular flange adapted to bear upon said ring.

In testimony whereof I affix my signature in the presence of two witnesses.

WILLIAM MILLSTEIN.

Witnesses:
  JNO. MAYO,
  J. B. JOHNSON.